April 6, 1965

I. L. JOY ETAL

3,177,481

ELECTRONIC ALERTNESS CONTROL

Filed Aug. 10, 1961

April 6, 1965   I. L. JOY ETAL   3,177,481
ELECTRONIC ALERTNESS CONTROL
Filed Aug. 10, 1961   4 Sheets-Sheet 3

United States Patent Office 3,177,481
Patented Apr. 6, 1965

3,177,481
ELECTRONIC ALERTNESS CONTROL
Ivan L. Joy and Laurence D. Long, Topeka, Kans., Walter L. More, 3230 Thayer, Evanston, Ill., and Troy H. Bickerstaff, Topeka, Kans., assignors to said More, as trustee
Filed Aug. 10, 1961, Ser. No. 130,632
18 Claims. (Cl. 340—279)

This application is filed as a continuation-in-part of our pending application Serial No. 56,261, filed September 15, 1960, now abandoned, and this invention relates to a method and apparatus for monitoring the vigilance to his control function of an operator located at a station equipped with control equipment.

More particularly, this invention relates to an alertness control for monitoring the vigilance of an engineer in an operating cab of a locomotive and the apparatus of this invention is intended to supplant the present day foot-operated "deadman" control.

There are a number of instances were serious accidents have occurred due to failure of the foot-operated "deadman" control to function as intended. There are many other known instances where the foot-operated "deadman" control has not performed its function though, fortunately, no serious consequences resulted.

The lack of reliability of the present day deadman control poses a serious problem and the principal object of the present invention is the provision of an electronic control system that monitors the vigilance of the engineer by detecting even slight changes in his posture; that is reliable and sensitive in its response but difficult to jam or circumvent; and that operates continuously without imposing objectionable operating burdens upon the engineer.

Another object of the invention is the provision of an alertness control apparatus and method that provides for continuously monitoring the vigilance of the engineer by repeatedly requiring that the engineer perform at least one of a number of routine motions or changes of position within a preselected time interval in order to prevent automatic operation of train control equipment, such motions or changes of position preferably being of a type normally occurring during the usual train operations.

Other objects and advantages will become apparent during the course of the following description.

In the accompanying drawings forming a part of this specification and in which like numerals are employed to designate like parts throughout the same.

Figure 1:
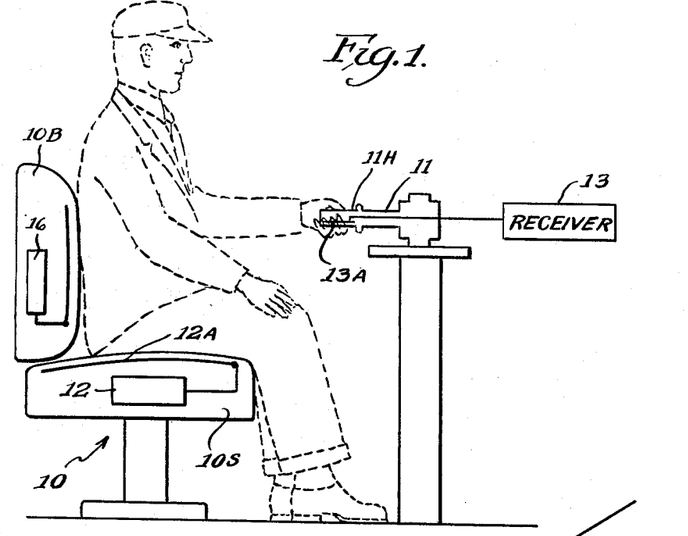
FIG. 1 is a diagrammatic illustration depicting familiar equipment of a locomotive cab.

Referring now to the drawings, and particularly to FIG. 1 thereof, an engineer is shown in a desired normal operating position on a seat structure 10 of the conventional type provided in a locomotive cab and one hand of the engineer is shown grasping the handle portion 11H of an air brake lever 11. The element 11 may be assumed to represent either the locomotive air brake lever or the train air brake lever and it is selected for this illustration of the invention because the convenience of its location in the cab makes it suitable for use in a vigilance control system that will not impose an undue burden upon the engineer but yet will be reliable and fool-proof in its operation.

The seat structure 10 includes a seat cushion 10S and a back cushion 10B and in accordance with this invention radio frequency energy is coupled between an antenna located in the seat structure and an antenna located in a conveniently accessible mechanism such as the air brake lever 11, with the circuit arrangement being such that the desired coupling of radio frequency energy is effected only when the engineer is seated in proper position and is attentively grasping the control lever mechanism in a prescribed convenient fashion. Thus the engineer may be said to function as a radio frequency link to establish the desired coupling of radio frequency energy.

It will become apparent that the radio frequency circuit may be arranged to transmit energy from the seat structure to the control lever or alternatively from the control lever to the seat structure but for purposes of illustrative disclosure a transmitter 12 is shown mounted within the seat cushion and provided with a transmititng antenna 12A which may be in the form of a piece of screen wire that is disposed directly beneath the upholstery of the seat cushion 10S and the receiver 13 is shown for mounting somewhere on the control panel of the locomotive and is connected to a receiving antenna 13A that is nested in insulated relation within an elongated recess 11R extending along the length of the underneath side of the operating handle for the air brake lever. The transmitter is preferably a transistor oscillator to conveniently accommodate its mounting within the seat cushion.

When the engineer is properly positioned on the seat, the radio frequency energy from the oscillator is coupled by capacity effect from the transmitting antenna 12A to the body of the engineer and if the engineer is properly grasping the control handle this energy is coupled by capacity effect from the body of the engineer to the receiving antenna 13A. The amount of radio frequency energy coupled through the engineer's body is a very minute quantity and a workable energy range may readily be maintained at a considerably lower level than exists in the control rooms of local radio stations.

Figure 2:
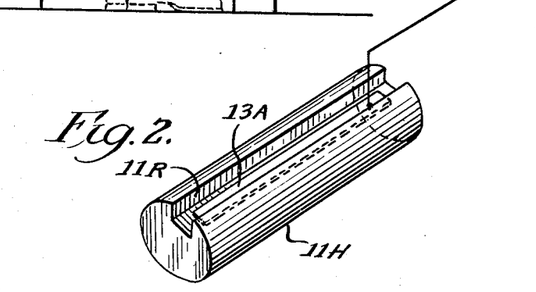
FIG. 2 is an enlarged perspective view illustrating an antenna arrangement mounted in the underneath side of a control handle, the view being illustrated as seen from beneath the handle.

In the preferred construction, the control handle is arranged as illustrated in FIG. 2, which depicts the handle in a view taken looking upwardly from beneath the handle, so that the elongated mounting recess 13R is somewhat deeper than the receiving antenna that is nested therein. The receiving antenna may be mounted on insulated spacers in any suitable fashion known to those skilled in this art and/or it may be coated with an insulating film. Coupling of energy to the receiving antenna occurs so long as the engineer's fingers are in a close proximity to the antenna element. It is not necessary nor desirable that they touch this element nor is it necessary that the fingers of the engineer tightly grasp the handle. This mounting arrangement thus requires no burdensome operation on the part of the engineer and yet any time that the engineer's fingers or hand relaxes such as occurs should the engineer fall asleep or die, his fingers would automatically drop way from the antenna sensing element 13A a distance sufficient to significantly change the amount of radio frequency coupled between the transmitter and receiver.

Figure 3:
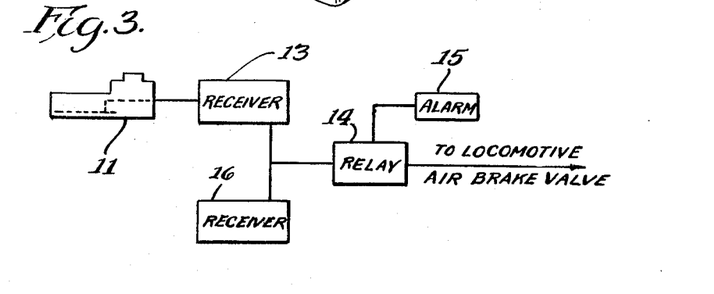
FIG. 3 is a block diagram of a static type receiver circuit arrangement in accordance with one embodiment of the invention.
Figure 4:
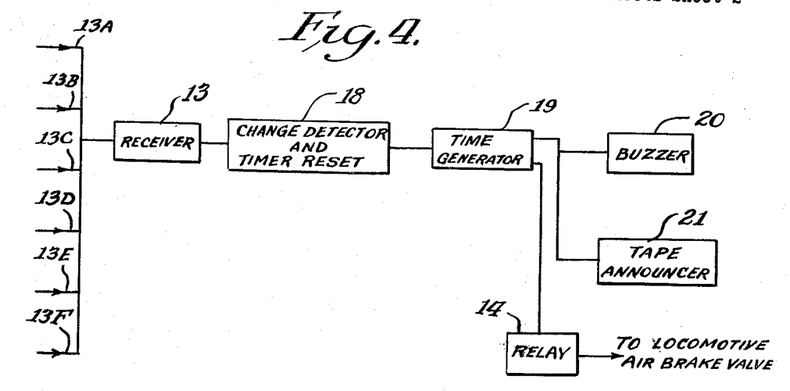
FIG. 4 is a block diagram of a dynamic or change sensing type of receiver circuit arrangement.
Figure 5:
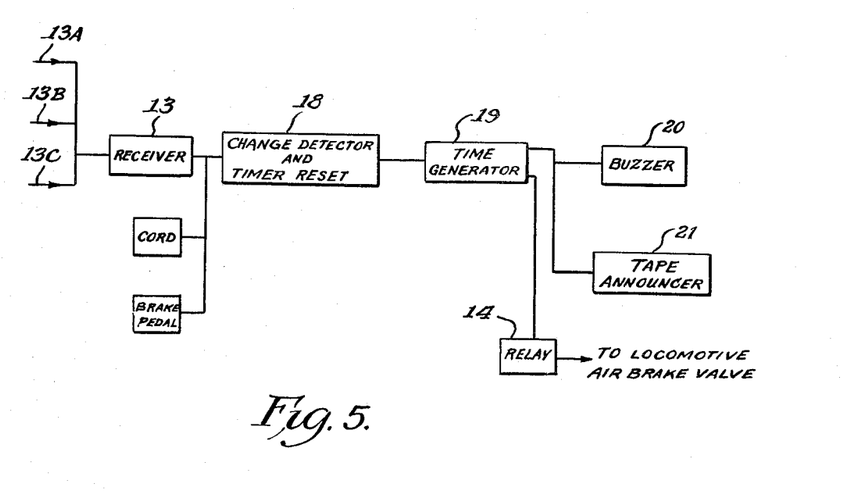
FIG. 5 is a block diagram of a receivre circuit arrangement like that of FIG. 4 but having a modified sensing element arrangement.

The inventive concepts of this invention are embodied in a static type control system illustrated in FIG. 3 and are embodied in a dynamic or change sensing type control system, two somewhat different forms of which are illustrated in FIGS. 4 and 5. In these figures, only the receiver section of the radio frequency circuit is illustrated and it will be apparent that the same transmitter arrangement may be utilized. It will also be apparent that the locations of the transmitter and receiver units may be interchanged.

In FIG. 3 the output of the receiver is shown connected to a control relay 14 which is arranged to operate the locomotive air brake valve for stopping the train whenever the receiver output becomes less than some preselected threshold value. In this embodiment of the invention, therefore, it is necessary for the engineer to remain properly seated and to continuously grasp the control handle 11H in order to prevent the alertness control system from functioning to stop the train. Any relaxation of the engineer's fingers, such as would result in them moving away from the underneath side of the control handle is sufficient to trigger the response of the alertness control system.

If desired, the relay device 14 may have a two-step sequential operating sequence in which case it may first operate an alarm 15 and, after a short delay, then operate the locomotive's air brake valve. The delay interval affords the engineer an opportunity to respond to the alarm and reestablish the required coupling relationship for disabling the relay before it completes its second step. This delay arrangement avoids unnecessary operation of the brakes.

A refinement of the system is also contemplated wherein, as shown in FIG. 1, a second receiver 16 is mounted in the back cushion 10B of the seat structure and is provided with a suitable antenna 16A which again may be a piece of screen wire located beneath the upholstery of the back cushion 10B of the seat structure and is provided with a suitable antenna 16A which again may be a piece of screen wire located beneath the upholstery of the back cushion. The receiver 16 is also connected to supply its output to the relay element 14 (see FIG. 3), with the parts being arranged so that the relay 14 is held inoperative only when both receivers are producing output resulting from the engineer being positioned so as to act as a radio frequency link between the transmitter and each of the receivers. Incorporation of this second receiver 16 makes the system of FIG. 3 more fool-proof in that it greatly complicates any procedures which might be devised for by-passing the electronic vigilance control system.

A dynamic or change sensing type of alertness control system is shown in FIG. 4 wherein the receiver 13 is provided with a number of separate receiving antenas 13A and 13F which are associated with various train control mechanisms located within the locomotive cab. By way of example, the antenna 13A may be located in the locomotive air brake handle 11, the antenna 13B may be similarly located in the train air brake handle; the antenna 13C may be suitably located in association with the throttle lever; the antenna 13D may be fitted in the brake pedal; the antenna 13E may be associated with the whistle cord and the antenna 13F may be associated with the reverse lever. Thus, each time the engineer makes a motion or change of position in relationship to any one of the train control mechanisms with which the antenna elements are associated, the level of radio frequency energy coupled to the receiver is changed by some detectable amount. Where the engineer moves into coupling relation with an antenna element this energy level increases and where the engineer moves away from coupling relationship with an antenna element this level decreases.

A change detector and timer reset circuit 18 is connected to receive output from the receiver 13 and is operable to control resetting of a continuously running time generator unit 19 which repeatedly attempts to execute a two-stage timing cycle. At the end of the first stage, a buzzer unit 20 and tape announcer 21 are operated to alert the engineer and at the end of the second stage of the cycle, the time generator operates a relay 14 which controls the locomotive air brake valve for automatically stopping the train.

The change detector unit responds to each detectable change in the level of the output from the receiver 13 such detectable changes being produced by changes of the relationship of the engineer with respect to one or more of the various antenna elements. For each such change, whether increasing or decreasing, the change detector generates a pulse to reset the time generator 19 to the starting point of its timing cycle. The continuously running generator 19 immediately begins to generate another timing cycle which, if not interrupted by another resetting function initiated by the change detector, will complete its first stage of the timing cycle whereupon it actuates the buzzer 20 and tape announcer 21, and if the engineer still does not acknowledge, by making some change in position, the second phase of the timing cycle continues to completion for actuating the relay 14 and automatically applying the air brakes. By way of example, the first phase of the timing cycle for operating the buzzer and tape announcer may be selected at 20 seconds and the second phase of the cycle may be selected at 5 seconds.

In summary, this dynamic type altertness control system functions to provide a continuously running timer which must be repeatedly reset before expiration of the full timing cycle, if automatic application of the brakes is to be avoided, the resetting being accomplished by change signals generated in response to movements or changes of position of the engineer in relation to the various antenna elements. It should be understood that if the engineer is holding the train air brake lever handle so as to establish coupling relationship it is sufficient that he merely release his grip slightly for creating a change in the level of the receiver output. Alternatively, if he is holding it loosely or not at all, he may create the desired change signal by more closely grasping the handle. The radio frequency monitoring system lends itself to adjustment so that a mere flicking of the fingers towards and away from the antenna element of any one of the train control mechanisms will produce a change signal sufficient to reset the timer.

It will be apparent that this dynamic or change sensing type alertness control system continuously monitors the engineer's alertness and it cannot be by-passed or circumvented by any stationary devices that have been used to evade the foot-operated "deadman" pedal that is in present day use. In accordance with this invention, individual antenna elements associated with each of the conveniently accessible train control mechanisms is preferred in order that the usual activities of the engineer will normally be sufficient to cause repeated resetting of the timer 19 without distracting the attention of the engineer.

At times when the engineer is extremely busy operating the locomotive, such as, for example, in crowded areas where there are numerous curves in the track, the whistle must be blown quite frequently and air must be applied to the brakes quite frequently. Each of these actions automatically acknowledges the engineer's alertness and produces change signals for resetting the timer without any conscious attention to this function on the part of the engineer.

However, when there is a long pull on a hill or a straight stretch of track or there is a delay on a siding, such that little or no control operations are involved, the alertness control system will repeatedly require the engineer to make some movement or change of position. It is during these long monotonous periods when the engineer is most likely to be lulled to sleep that the alertness control system is needed and in the present invention this is the time when the alertness control system is most active in its monitoring of the engineer.

The length of the timing cycle may obviously be selected at any desired interval but the regularity of a timing cycle approach results in a continuously effective monitoring system which operates with equal effectiveness whether the train is traveling at high speed or is crawling along a siding. As a further feature of the system, it is contemplated that the length of the timing cycle may be automatically correlated with the locomotive speed so that when the locomotive is operating at high speed the timing cycle may be reduced to as little as 5 or 10 seconds. The time generator 19 is preferably an electronic timing circuit having a resistor-capacitor network connected for charging from a transistorized source. A resistor-capacitor network is readily adjustable to regulate the length of the timing cycle and it facilitates correlation with locomotive speed by supplying a feed-back voltage for shortening the charging time in proportion with increases in the locomotive speed.

A modified dynamic or change sensing type of alertness control system is shown in FIG. 5 wherein antenna elements 13A, 13B and 13C for the locomotive air brake, train air brake, and throttle, respectively, are shown with other elements such as the whistle cord and brake pedal being represented as controlling separate circuits connected to the output of the receiver. For example, actuation of the cord might operate a sensing switch for controlling circuit contacts to supply an increased or decreased voltage to the input of the change detector. It is not absolutely necessary to the system that antenna elements and radio frequency coupling techniques be used, though this is the preferred constructional embodiment due to its high sensitivity, its convenience, and its low cost.

This dynamic alertness control system has the important advantage that it is practically impossible to foul it up. The engineer must make some type of movement or change in position and for his convenience the system is responsive even to very small changes such as the partial release of his fingers from a handle lever or the mere touching of a pedal. The arrangement continuously monitors the alertness without imposing added burdens on the engineer when he is busy and it is free of any jamming techniques that might be attempted.

Figure 6:
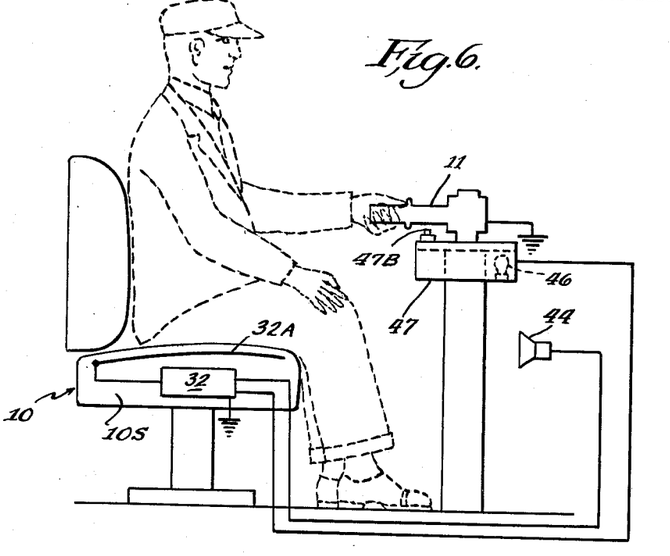
FIG. 6 is a diagrammatic illustration of a locomotive cab arrangement equipped with a simplified alertness control for monitoring viligance of the engineer to his control function.
Figure 7:
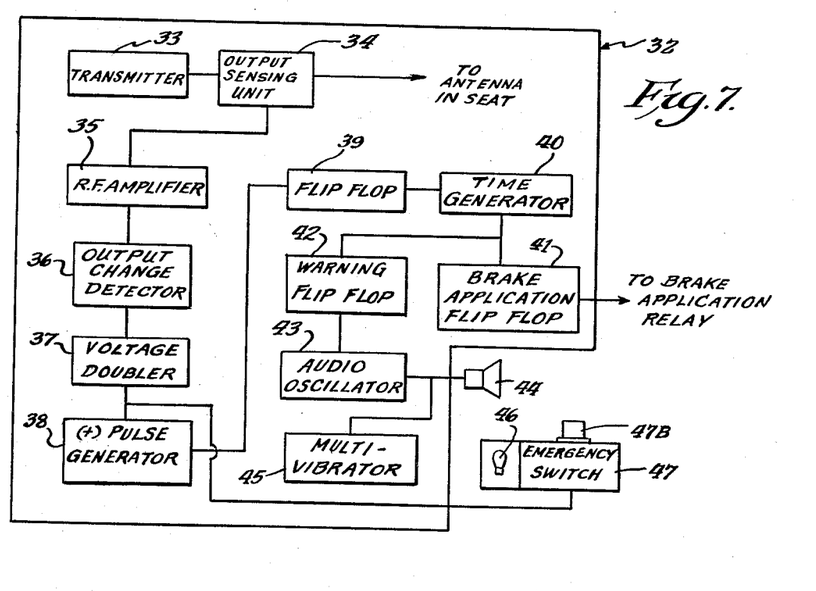
FIG. 7 is a block diagram of the circuitry embodied in the control system depicted in FIG. 6.

A simplified alertness control arrangement is illustrated in FIGS. 6 and 7. FIG. 6 illustrates a locomotive cab arrangement that includes a seat structure 10 for supporting an engineer in proper position to operate the train control equipment, which again may include a locomotive air brake handle 11, a train air brake handle (not shown), a throttle lever (not shown), and a reverse lever (not shown). The seat structure 10 includes the usual seat cushion 10S within which is mounted a compact electronic transmitter and control unit 32 that connects to a transmitting antenna 32A which is shown disposed directly beneath the upholstery of the seat cushion to provide maximum coupling of radio frequency energy through the engineer. The circuitry contained in the electronic unit 32 is illustrated in the block diagram of FIG. 7 and it is preferably transistorized in which case it may be and has been embodied in a case that is 10" x 5" x 2".

The control system of FIGS. 6 and 7 eliminates need for the various sensing elements and connecting wires that are provided for the equipment control handles in the arrangements shown in FIGS. 1 to 5, this being accomplished by utilizing the changes in output signal strength from the transmitter occasioned by changes in the radio frequency coupling relationship between the engineer and various electrically grounded elements in the cab. For example, when the engineer grasps or releases his grip on any electrically grounded control handle or other grounded metal surface in the cab or when the engineer sufficiently varies the contact area of his hands or other parts of his body on these grounded surfaces the output signal transmitted from the electronic gear will vary inversely as the resistance of the total contact area. Changes of this type are sensed as indications of the engineer's continued alertness and vigilance to his control function. In this respect the system of FIGS. 6 and 7 is like the dynamic or change-sensing type of control system shown in FIGS. 4 and 5, but it is even less of a burden upon the engineer and it is easier to install and more reliable in operation.

It is preferred that the antenna 32A span substantially the entire area of the seat cushion in order to establish minimum resistance coupling contact to the body of the operator. Then most of the resistance in the circuit is provided in the relationship between the operator's fingers or hands and the grounded surfaces in the cab. With this arrangement a substantial bouncing of the operator on the seat cushion can be tolerated without appreciably varying the overall resistance of the circuit.

The preferred circuit arrangement for the electronic gear 32, as shown in FIG. 7, includes a continuously operating transmitter 33 feeding through an output sensing unit 34 to the seat antenna 32A. The transmitter 33 may include a transistorized fixed frequency oscillator and an isolation amplifier. The current from the transmitter passing through the output sensing unit 34 will vary as the positional relationship of the engineer is varied with respect to electrically grounded surfaces such as the locomotive air brake handle 11.

Such variations in the strength of the transmitted signal are fed to an RF amplifier 35 which is connected to supply an amplified signal to an output change detector 36 of a type that produces a positive output pulse when the current through the output sensing unit 34 increases and a negative output pulse when this current decreases. The output pulses from the change detector 36 are passed through a voltage doubler network 37 to a (+) pulse generator 38. To provide (+) pulses in its output the (+) pulse generator 38 amplifies positive input pulses and inverts and amplifies negative input pulses. The generator 38 is connected to supply its positive output pulses to a flip flop circuit 39.

A time generator as shown at 40 is continuously operable for generating a complete timing cycle of predetermined duration. The time generator 40 may be of a type wherein a capacitor is charged slowly until it reaches a certain value at which it triggers a brake application flip flop circuit 41 that is connected to actuate the brake application relay that is conventionally provided in the locomotive cab. The charging time for the capacitor of the time generator may be preselected in the range of 20 to 45 seconds. The time generator 40 may be made resettable by means of a clamping transistor driven from the flip flop 39 and connected to discharge the timing capacitor which then immediately begins to recharge for generating another timing cycle. Any detectable movement of the engineer prior to generation of a complete timing cycle operates the flip flop 39 to reset the time generator 40.

Since it may frequently occur that the engineer, though alert and vigilant, makes no detectable movement within the timing cycle provided by the time generator, warning facilities for alerting the engineer to this fact are provided and this eliminates unnecessary emergency brake applications. These warning facilities may include a warning flip flop circuit 42 connected to respond to the voltage build up on the timing capacitor of the time generator and arranged to trigger at a lower voltage than that which triggers the brake application flip flop. Thus, the warning flip flop 42 will be triggered several seconds prior to the time for triggering of the brake application flip flop 41. The warning flip flop 42 will also be reset each time the time generator 40 is reset by the flip flop 39.

The warning flip flop 42 is connected to drive an audio oscillator 43 that is preferably arranged to supply an intermittent audio signal to a speaker 44 to produce a distinctive intermittent beeping sound for several seconds prior to the time for actuation of the brake application relay. A multivibrator 45 is also connected to receive output from the audio oscillator 43 and to respond to each beep signal to flash a warning light 46 which is preferably located within an emergency acknowledge switch unit 47.

The emergency acknowledge switch is equipped with a push button 47B for convenient manual operation and is connected to trigger the (+) pulse generator 38 for producing a positive output pulse that will actuate the flip flop 39 and reset the time generator 40; thereby temporarily preventing operation of the brake application relay. Thus, the purpose and function of the arrangement is to stop the locomotive only if the engineer is not sufficiently alert to perform his duties. The engineer may allay or reset the device by acknowledging it prior to expiration of the predetermined timing cycle. Normally, the required acknowledgment is achieved by the engineer either grasping or releasing a grounded control handle or bringing a part of his body into contact with or breaking contact with a grounded metal surface, or by causing sufficient change in the contact area between the hands or body of the engineer and the grounded handles and other metal surfaces in the cab. If, for any reason, these procedures fail to acknowledge the device as may occur if the engineer is wearing thick cotton or lined leather gloves, he may push the button 47B of the emergency acknowledge switch 47.

The circuits of the change sensing type warning system are designed so that the device is fail-safe. If the electrical power fails, or if components or circuits other than the warning circuits fail to function, the brake application relay will operate, causing the locomotive to stop. If the warning device circuits should fail, actuation of the brake application relay may be arrested by the engineer by repeatedly operating the emergency acknowledge switch 47.

Figure 8:
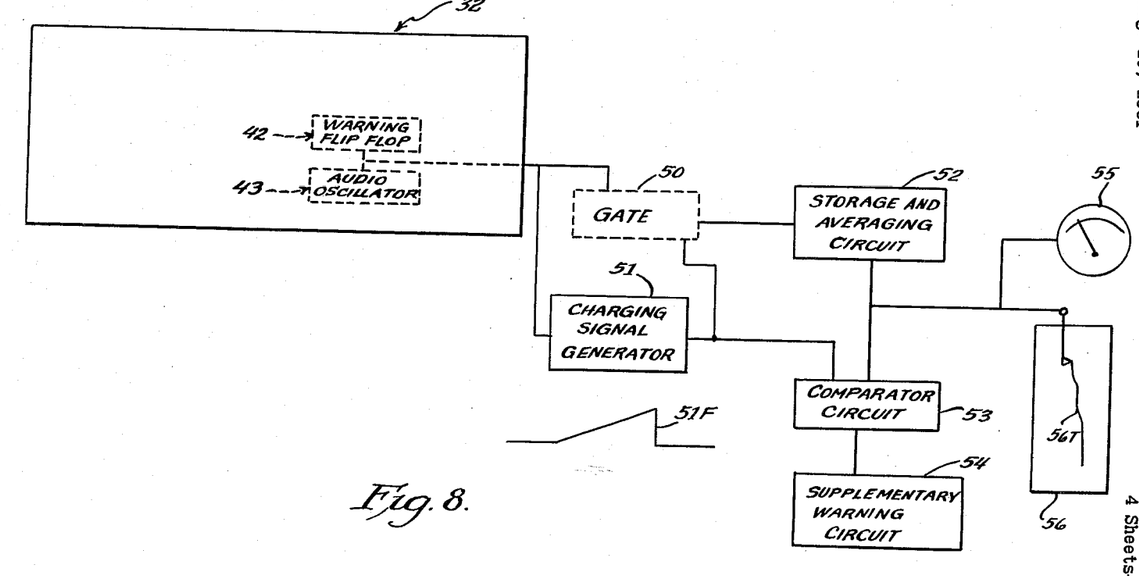
FIG. 8 is a block diagram of a circuit for comparing the engineer's alertness throughout the duration of his control function.

A further refinement can be provided for detecting any change in an operator's alertness or response efficiency throughout the duration of his control function and in FIG. 8 a block diagram of a comparison circuit for this purpose is shown and for purposes of illustrative disclosure, it is shown connected to the output of the warning flip flop circuit 42 in the control unit 32 of FIG. 7. As the description proceeds, it will become apparent that the comparison circuit might alternatively be connected to receive output from the feed line to the buzzer 20 and tape announcer 21 shown in FIGS. 4 and 5.

The purpose of the comparison circuit shown in FIG. 8 is to establish a measure of the operator's response to the initial warnings provided by the speaker 44 and the flashing light 46 and to store this information for continually comparing it with the response efficiency of the operator at later times. This approach assumes the operator will be functioning at standard efficiency at the beginning of his shift and if he should become tired or sleepy, comparison of his initial response efficiency with his current response efficiency will alert him to this fact.

In FIG. 8 a gate circuit 50 and charging signal generator 51 are shown connected to the output of the warning flip flop 42 contained in the control unit 32 of FIG. 7 and are triggered concurrently each time the warning flip flop 42 operates and are reset each time the warning flip flop 42 is reset. Thus, the charging signal generator 51 operates throughout the interval of operation of the warning equipment which includes the audio oscillator 43 and speaker 44 of FIG. 7 and this interval is determined by the time required for the operator to respond to and acknowledge the beeping sound from the speaker 44 and/or the flashing signal from the light 46. The charging signal generator preferably produces an output voltage function that is linear with time, as indicated at 51F.

The output voltage developed in the generator 51 is switched into a storage and averaging circuit 52 under the control of the gate 50 and as successive acknowledgment sequences occur an averaged value is produced in the storage circuit 52 and represents the response efficiency of the operator. This averaged signal is continuously fed to a comparator circuit 53 which also receives the voltage signals developed by the generator 51 and compares these with the averaged value from the storage circuit 52.

By way of example, if the voltage generator is producing a signal on the order of five volts at the beginning of the operator's control function when he is wide awake and has a high response efficiency, at some later time the voltage may rise to ten volts due to delayed acknowledgment when the operator's response efficiency becomes lower, and when this is compared with the averaged value of five volts the comparator will trigger a supplementary warning circuit 54 which informs the operator that his response efficiency has become too low.

If desired, the circuit of FIG. 8 may be held disabled until a sufficient number of acknowledgment sequences have occurred to develop a representative average in the storage and average circuit 52. Alternatively, this circuit may have a built in minimum average and in either case this avoids unnecessary operation of the supplementary warning circuit at the beginning of an operator's control function.

A meter 55 is shown connected to receive the averaged output signal from the storage circuit 52 and it will continuously indicate to the operator any changes in his response efficiency. Similarly a tape and recorder unit 56 is connected to the output from the storage circuit 52 to record a trace 56T representative of the operator's response efficiency throughout the duration of his control function. Tape travel of as little as 1 or 2" per hour is sufficient to provide the desired record of the operator's response efficiency.

For purposes of illustrative disclosure, the invention has been described in connection with monitoring the vigilance of an engineer in a locomotive cab, but it should be appreciated that it may also be applied for monitoring the vigilance of an operator at control stations of other forms. For example, it may be applied to airplane pilots in the cockpit of a plane, to truck drivers in the cabs of trucks, to radar operators at supervisory control stations and to numerous other situations where alertness of an operator is required.

What is claimed is:

1. An electronic safety circuit for regulating a control device that monitors vigilance of an operator to his control function at a station that is equipped with control equipment and that is equipped with a support for locating the operator in proper relationship to such control equipment, said control device including operating means for regulating operation of safety equipment for said station, said electronic safety circuit including a transmitter of alternating current energy, sensing means responsive to alternating current energy flow in said circuit and connected to actuate said operating means, and alternating current energy coupling elements operatively connected to said support and to said control equipment to coact in defining an alternatnig current transmission link through the operator when the operator is in proximity concurrently to said support and said control equipment such that alternating current energy flow in said circuit is accomplished by energy coupling through said link in accordance with the positional relationship of the operator between said support and said control equipment.

2. An electronic safety circuit for regulating a control device that monitors vigilance of an operator to his control function at a station that is equipped with control equipment and that is equipped with a support for locating the operator in proper relationship to such control equipment, said control device including resettable means continuously operable for generating a timing cycle, means responsive to said resettable means upon generation of a complete timing cycle thereby for automatically operating safety equipment for said station and means for restoring the resettable means to recycle the device, said electronic safety circuit including a transmitter of alternating current energy, sensing means responsive to alternating current energy flow in said circuit and connected to actuate said restoring means, and alternating current energy coupling elements operatively connected to said support and to said control equipment to coact in defining an alternating current transmission link through the operator when the operator is in proximity concurrently to said support and said control equipment such that alternating current energy flow in said circuit is accomplished by energy coupling through said link in accordance with the positional relationship of the operator between said support and said control equipment, said alternating current energy sensing means being connected in said circuit to respond to a predetermined change in the energy flow through said link and having means connected to actuate said restoring means upon any change in the positional relationship of the operator that produces said predetermined energy change.

3. An electronic safety circuit for regulating a control device that monitors vigilance of an operator to his control function at a station that is equipped with control equipment and that is equipped with a support for locating the operator in proper relationship to such control equipment, said control device including operating means for regulating operation of safety equipment for said station, said electronic safety circuit including a transmitter of alternating current energy, sensing means responsive to alternating current energy flow in said circuit and connected to actuate said operating means, and alternating current energy coupling elements operatively connected to said support and to said control equipment to coact in defining an alternating current transmission link through the operator when the operator is in proximity concurrently to said support and said control equipment such that alternating current energy flow in said circuit is accomplished by energy coupling through said link in accordance with the positional relationship of the operator between said support and said control equipment, said sensing means having means connected to prevent actuation of said operating means only when subjected to a continuous energy flow in said circuit such as is established when the operator is located at said support and is actively performing his control function with respect to said control equipment.

4. An electronic control device for monitoring vigilance to his control function of an engineer in a locomotive cab that has train control handle structure and seat structure for supporting an engineer in position to hold said handle structure, said device comprising a resettable timer continuously operable for generating a timing cycle, means responsive to said timer upon generation of a complete timing cycle thereby for automatically operating safety equipment, means in said cab including a transmitter of radio frequency energy having an antenna mounted in said seat structure and a receiver of radio frequency energy having an antenna mounted on said handle structure to form a radio frequency link coupling energy through the engineer when the engineer is in proper position on said seat structure and is handling said handle structure, and sensing means responsive to changes in the amount of radio frequency energy coupled from the transmitter to the receiver and connected to reset said timer.

5. An electronic control device for monitoring vigilance to his control function of an operator located at a station having safety equipment and having manually operable control equipment and structure for supporting an operator in position to manipulate said control equipment, said device comprising a resettable time continuously operable for generating a timing cycle, means responsive to said timer upon generation of a complete timing cycle thereby for automatically operating said safety equipment, means including a transmitter of radio frequency energy having an antenna located at said structure to form a radio frequency link coupling energy through an operator supportedly positioned on said structure, the energy coupled through the operator being variable in accordance with the positional relationship of the operator to said control equipment at said station, sensing means connected between said transmitter and said antenna and responsive to changes in the amount of radio frequency energy passing from said transmitter to said antenna, and means responsive to said sensing means for resetting the timer for each change sensed thereby.

6. An electronic control device for monitoring vigilance of an engineer in a locomotive cab that has operating mechanisms for train control equipment and structure for supporting an engineer in position to operate said mechanisms, said device comprising a transmitter and a receiver of radio frequency energy mounted in said cab, a continuously running timer operable upon completing a predetermined cycle for actuating train control equipment, means responsive only to changes in the output from said receiver for resetting said timer, and means forming a radio frequency link through the engineer when the engineer is properly positioned on said structure and is touching one or more of said mechanisms for coupling varying amounts of energy from said transmitter to said receiver in accordance with changes in the relationship between the engineer and said mechanisms.

7. An electronic control device for monitoring vigilance of an engineer in a locomotive cab that has operating mechanisms for train control equipment and structure for supporting an engineer in position to operate said mechanisms, said device comprising a transmitter and a receiver of radio frequency energy mounted in said cab, a continuously running timer operable upon completing a predetermined cycle for producing an actuating signal, means connected to respond to said signal for indicating the completion of the timing cycle, means for operating certain train control equipment in a predetermined fashion, delay means connecing said actuating signal from said timer to said last named means, means responsive only to changes in the output from said receiver for resetting said timer, and means forming a radio frequency link through the engineer when the engineer is properly positioned on said structure and is touching one or more or said mechanisms for coupling varying amounts of energy from said transmitter to said receiver in accordance with changes in the relationship between the engineer and said mechanisms.

8. Apparatus for monitoring the vigilance to his control function of an operator of control equipment and comprising a resettable timer continuously operable for generating a timing cycle, means responsive to generation of a complete timing cycle by said timer for automatically operating safety equipment, a resettable warning device connected to respond shortly prior to completion of a timing cycle, means for sensing movements of the operator incident to performance of his control function, means responsive to the last named sensing means for resetting the timer and warning device for each operator movement sensed thereby, means connected to the warning device for measuring the response time required for the operator to reset said warning device, and means for indicating changes in said response time.

9. Apparatus for monitoring the vigilance to his control function of an operator of control equipment and comprising a resettable timer continuously operable for generating a timing cycle, means responsive to generation of a complete timing cycle by said timer for automatically operating safety equipment, a resettable warning device connected to respond shortly prior to completion of a timing cycle, means for sensing movements of the operator incident to performance of his control function, means responsive to the last named sensing means for resetting the timer and warning device for each operator movement sensed thereby, a resettable generating device connected to operate concurrently with said warning device to produce an output signal representative of the response time of the operator, a storage circuit connected to receive successive output signals from said generating device and including means for storing and averaging such output signals to provide a signal factor representative of the over-all response efficiency of the operator, and a comparison circuit connected to receive and compare said signal factor with each current output signal from said charging signal generating device for indicating any decrease in the response efficiency of the operator.

10. An electronic control device for monitoring vigilance to his control function of an operator located at a station equipped with control equipment, said device comprising resettable means continuously operable for generating a timing cycle, means responsive to said resettable means upon generation of a complete timing cycle thereby for automatically operating safety equipment, means including a transmitter of radio frequency energy located at said station in proximity to an operator located thereat to complete a radio frequency link from the transmitter, through the operator and to said control equipment, said link coupling energy through the operator in accordance with the positional relationship of the operator to said control equipment, sensing means responsive to a predetermined change in the amount of radio frequency energy coupled through said link to thereby sense any change in said positional relationship of the operator that produces said predetermined energy change, and means responsive to said sensing means for restoring the resettable means for each such operator movement sensed thereby.

11. An electronic control device for monitoring vigilance to his control function of an operator located at a station equipped with control equipment, said device comprising resettable means continuously operable for generating a timing cycle, means responsive to said resettable means upon generation of a complete timing cycle thereby for automatically operating safety equipment, a warning device connected to said resettable means to respond shortly prior to generation of a complete cycle by said resettable means, means including a transmitter of radio frequency energy located at said station in proximity to an operator located thereat to complete a radio frequency link from the transmitter, through the operator and to said control equipment, said link coupling energy through the operator in accordance with the positional relationship of the operator to said control equipment, sensing means responsive to a predetermined change in the amount of radio frequency energy coupled through said link to thereby sense any change in said positional relationship of the operator that produces said predetermined energy change, and means responsive to said sensing means for restoring the resettable means and the warning device for each such operator movement sensed thereby.

12. An electronic control device in accordance with claim 11 and including acknowledgment means connected for restoring the resettable means and the warning device, said acknowledgment means being operable independently of said sensing means in response to a preselected movement of the operator.

13. In a locomotive cab that includes train control handle structure and seat structure for supporting an engineer in position to operate said handle structure, a control system mounted in said cab and comprising a transmitter of radio frequency energy having an antenna mounted in one of said structures and a receiver having an antenna mounted in the other of said structures for coupling a selected amount of radio frequency energy between said antennas only when the engineer is seated on said seat structure and holding said handle structure, and means connecting said receiver to operate equipment for controlling said cab in a predetermined fashion when coupling of said energy between said antennas terminates.

14. An electronic control device for monitoring vigilance of an engineer in a locomotive cab that has train control handle structure and seat structure for supporting an engineer in position to hold said handle structure, said device comprising means in one of said structures for transmitting radio frequency energy and means in the other of said structures for receiving radio frequency energy for forming a radio frequency circuit only when the engineer is seated on said seat structure and holding said handle structure, and means responsive to output from said receiving means and connected for controlling said cab.

15. An electronic control device for monitoring vigilance of an engineer in a locomotive cab that has a train control handle and structure for supporting an engineer in position to grasp said handle, said device comprising means for transmitting radio frequency energy and means for receiving radio frequency energy mounted in said cab for completing a radio frequency circuit therebetween by coupling the radio frequency energy through the engineer only when the engineer is positioned on said structure and is grasping said handle, and means responsive to output from said receiver and connected for controlling said cab.

16. In a locomotive cab that includes a train control handle and a seat having a seat cushion and back cushion for supporting an engineer in position to grasp said handle, an electronic control device mounted in said cab and comprising a transmitter of radio frequency energy having an antenna mounted in said seat cushion, a first receiver of radio frequency energy having an antenna mounted in said back cushion, a second receiver of radio frequency energy having an antenna mounted in said handle, and a relay connected for receiving output from both said receivers when the engineer is in proper position on said seat and is grasping said handle, said relay being responsive upon interruption of output from either or both said receivers for controlling said cab in a predetermined fashion.

17. An electronic control device for monitoring vigilance of an engineer in a locomotive cab that has a train control handle and structure for supporting an engineer in position to grasp said handle, said device comprising a transmitter unit and a receiver unit for radio frequency energy mounted in said cab, means including an antenna element recessed in said handle for coupling relationship with a hand grasping said handle for completing a radio frequency circuit between said units by coupling radio frequency energy through the engineer only when the engineer is positioned on said structure and has one hand grasping said handle, and means responsive to output from said receiver and connected for controlling said cab.

18. An electronic control device for monitoring vigilance to his control function of an operator located at a station equipped with control equipment, said device comprising resettable means continuously operable for generating a timing cycle, means responsive to said resettable means upon generation of a complete timing cycle thereby for automatically operating safety equipment, means including a transmitter of alternating current energy located at said station in proximity to an operator located thereat to complete an alternating current transmission link from the transmitter, through the operator and to said control equipment, said link coupling energy through the operator in accordance with the positional relationship of the operator to said control equipment, sensing means responsive to a predetermined change in the alternating current energy coupled through said link to thereby sense any change in said positional relationship of the operator that produces said predetermined energy change, and means responsive to said sensing means for restoring the resettable means for each such operator movement sensed thereby.

References Cited by the Examiner

UNITED STATES PATENTS

| | | | |
|---|---|---|---|
| 2,172,116 | 9/39 | Warren | 340—279 |
| 2,186,825 | 1/40 | Dome | 340—258 |
| 2,187,761 | 1/40 | Torrens | 340—279 |
| 2,625,594 | 1/53 | Mathis | 340—279 |
| 2,724,109 | 11/55 | Skolnick et al. | 340—279 |
| 2,743,433 | 4/56 | Parmet | 340—258 |
| 2,782,406 | 2/57 | Krakora | 340—258 |
| 2,789,283 | 4/57 | Kane | 340—279 |
| 2,875,430 | 2/59 | Kayser | 340—279 |
| 2,963,627 | 12/60 | Buchsbaum | 340—258 X |
| 3,051,258 | 8/62 | Byers | 340—279 |

FOREIGN PATENTS 388,607  3/33  Great Britain.

NEIL C. READ, *Primary Examiner.*
ROBERT H. ROSE, *Examiner.*

UNITED STATES PATENT OFFICE
CERTIFICATE OF CORRECTION

April 6, 1965

Patent No. 3,177,481

Ivan L. Joy et al.

It is hereby certified that error appears in the above numbered patent requiring correction and that the said Letters Patent should read as corrected below.

Column 1, line 26, for "The" read -- This --; line 60, for "receivre" read -- receiver --; column 10, line 1, for "time" read -- timer --; line 50, for "or" read -- of --.

Signed and sealed this 24th day of August 1965.

(SEAL)
Attest:

ERNEST W. SWIDER
Attesting Officer

EDWARD J. BRENNER
Commissioner of Patents